United States Patent
Norton, Jr. et al.

(10) Patent No.: US 6,344,981 B1
(45) Date of Patent: Feb. 5, 2002

(54) POWER SUPPLY CIRCUIT AND METHOD OF CALIBRATION THEREFOR

(75) Inventors: David E. Norton, Jr., Boulder; Christopher J. Wells, Broomfield; John S. Gablenz, Arvada, all of CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/492,345

(22) Filed: Jan. 27, 2000

Related U.S. Application Data
(60) Provisional application No. 60/165,667, filed on Nov. 16, 1999.

(51) Int. Cl.[7] .............................................. H02M 3/335
(52) U.S. Cl. ..................................... 363/21.01; 363/20
(58) Field of Search ........................ 363/15, 16, 20, 363/21.01, 21.04, 21.12, 55, 56.01, 56.09, 95, 97, 131

(56) References Cited

U.S. PATENT DOCUMENTS

| | | | |
|---|---|---|---|
| 4,688,158 A | * 8/1987 | Peterson et al. ............... | 363/21 |
| 4,843,495 A | 6/1989 | Georgis et al. | |
| 4,845,577 A | 7/1989 | Georgis et al. | |
| 5,050,018 A | 9/1991 | Georgis et al. | |
| 5,285,366 A | * 2/1994 | Zaretsky ....................... | 363/56 |
| 5,631,504 A | * 5/1997 | Adahan ......................... | 307/72 |
| 5,680,269 A | 10/1997 | Georgis et al. | |
| 5,892,355 A | * 4/1999 | Pansier et al. ............... | 323/315 |
| 5,986,911 A | * 11/1999 | Tang ............................. | 363/89 |
| 5,995,384 A | * 11/1999 | Majid et al. .................. | 363/21 |
| 6,137,696 A | * 10/2000 | Hall et al. .................... | 363/21 |

* cited by examiner

*Primary Examiner*—Matthew Nguyen
(74) *Attorney, Agent, or Firm*—Nixon & Vanderhye, P.C.

(57) ABSTRACT

A power supply circuit (120) for supplying power to a load (130) comprises a regulator (122), a switching transistor (124) connected to the regulator; and a power transformer (126) connected between the switching transistor and the load. The regulator is of a type that requires feedback regarding the amount of voltage supplied to the load. In accordance with the present invention, a feedback signal to the regulator is generated by monitoring an input to the power transformer. In particular, a voltage signal related to a voltage on the primary of the power transformer after a voltage spike is applied as the feedback signal to the regulator. A peak detector (140) detects the to voltage spike and applies the voltage signal to the regulator. A peak detector reset circuit (142) resets the peak detector. In one example context of usage, a variable air gap exists between a stationary primary of the power transformer and a secondary of the power transformer. For example, the secondary of the power transformer can be mounted with the load on a rotatable element, such as a rotating drum of a magnetic tape drive. A zener diode (6) is connected in parallel across the secondary of the power transformer.

22 Claims, 7 Drawing Sheets

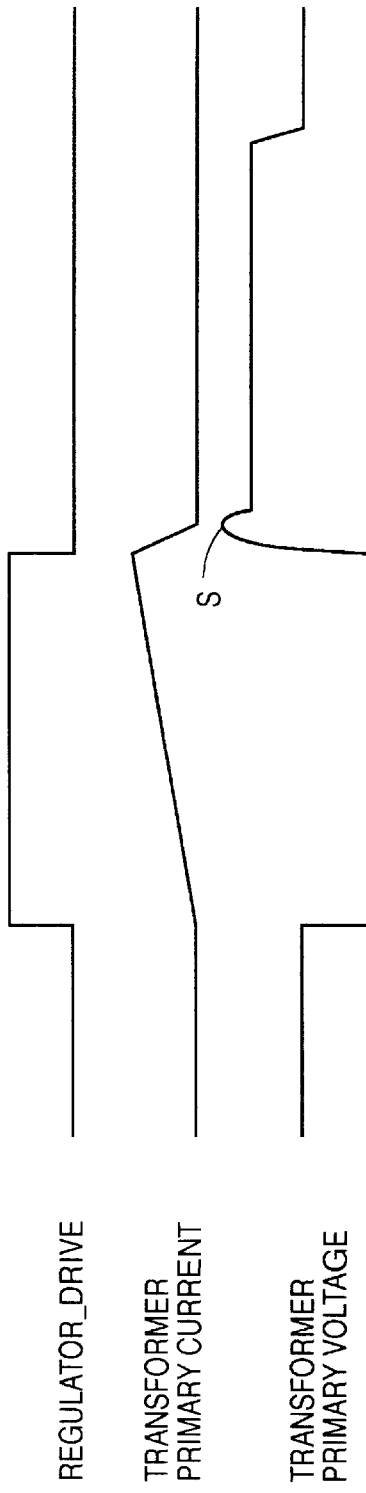
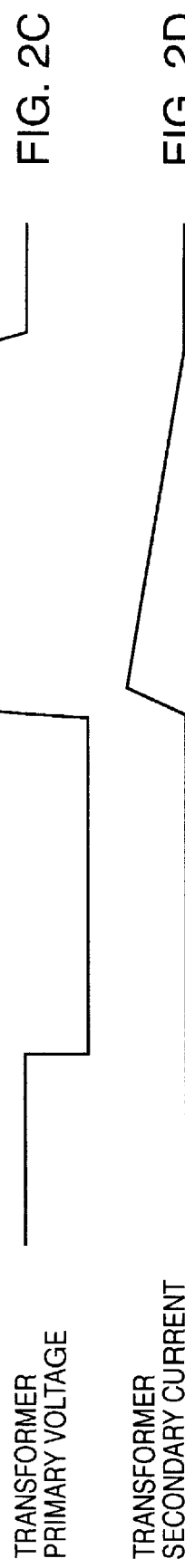
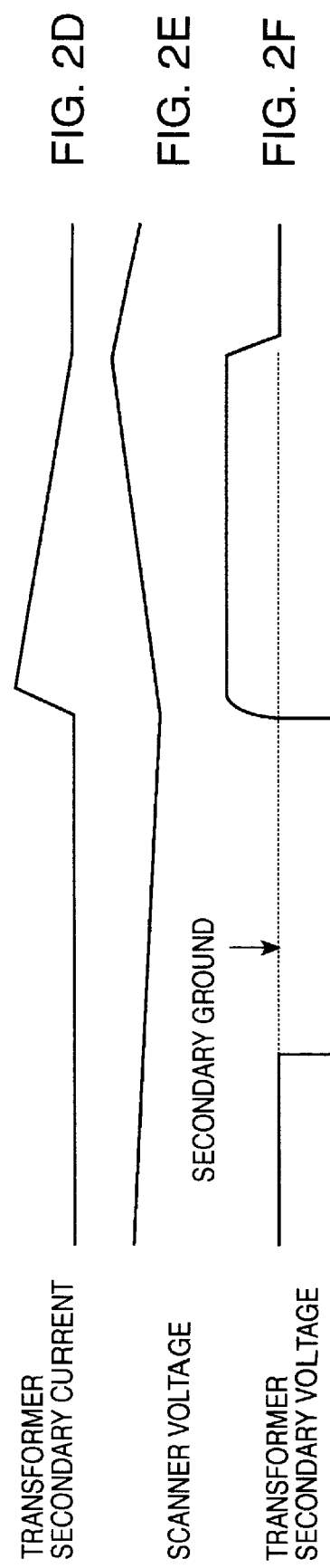
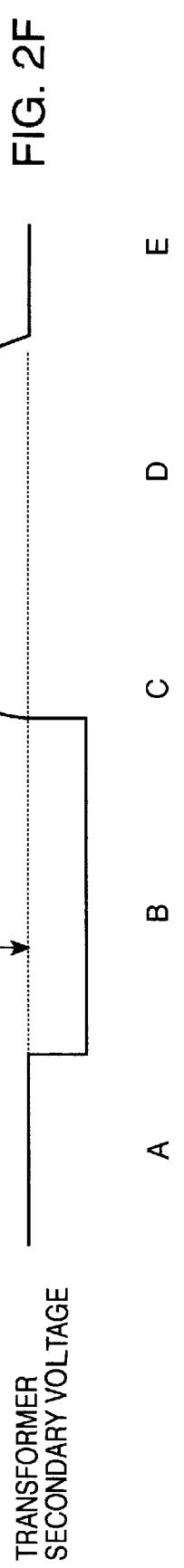
FIG. 2A
FIG. 2B
FIG. 2C
FIG. 2D
FIG. 2E
FIG. 2F

POWER SUPPLY CIRCUIT AND METHOD OF CALIBRATION THEREFOR

This application claims the benefit and priority of U.S. Provisional Patent Application Serial No. 60/165,667 filed Nov. 16, 1999, which is incorporated herein by reference in its entirety.

BACKGROUND

1. Field of the Invention

The present invention pertains to providing output feedback to a regulator, particularly to a regulator for a switch mode power supply.

2. Related Art and Other Considerations

Various electronic devices utilize a regulated, switch mode power supply circuit. In a switch mode power supply, D.C. power is supplied and therefore requires some type of switching to couple it across a transformer. Regulation is advantageous so that the power supply need not deliver its peak power level at all times to the load, which might result in losing the unused power (which is the difference between the worst case peak power and the current requirement) in the form of heat.

The desire for regulation requires that the voltage output of the power supply circuit be observable. Traditional forms of providing this output feedback are a separate transformer or an optical isolator. Either of these solutions necessitates additional cost, e.g., either an additional winding on the pancake transformer or a LED/photo transistor pair.

What is needed, therefore, and an object of the present invention, is a technique for generating feedback without the use of additional transducers or optical isolators.

BRIEF SUMMARY OF THE INVENTION

A power supply circuit for supplying power to a load comprises a regulator, a switching transistor connected to the regulator; and a power transformer connected between the switching transistor and the load. The regulator is of a type that requires feedback regarding the amount of voltage supplied to the load. In accordance with the present invention, a feedback signal to the regulator is generated by monitoring an input to the power transformer. In particular, a voltage signal related to a voltage on the primary of the power transformer after a voltage spike is applied as the feedback signal to the regulator. A peak detector detects the voltage spike and applies the voltage signal to the regulator. A peak detector reset circuit resets the peak detector.

The peak detector preferably comprises a transistor connected as an emitter follower between the primary of the power transformer and ground. A collector of the power transformer is connected to the primary of the power transformer and an emitter of the transistor is connected to the regulator.

In one example context of usage, a variable air gap exists between a stationary primary of the power transformer and a secondary of the power transformer. For example, the secondary of the power transformer can be mounted with the load on a rotatable element, such as a rotating drum of a magnetic tape drive. A zener diode is connected in parallel across the secondary of the power transformer.

Thus, in the switch mode power supply of the invention, feedback for its operating level is taken from a driven transformer primary, simplifying the system in terms of both cost and complexity.

Moreover, a method of calibrating the supply advantageously does not require additional test equipment, is simple, provides a robust operating point. One example employment of the power supply of is for use on a rotating head magnetic storage device, in which the calibration method can be accomplished using firmware by the drive in the field. In accordance with the calibration method, a zener diode is connected in parallel a cross the secondary of the power transformer. An operating voltage point of the regulator is set to a point just before a voltage at which the zener diode turns on.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2A–FIG. 2F are diagrammatic views showing selected waveforms at various locations in the circuit of FIG. 1.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
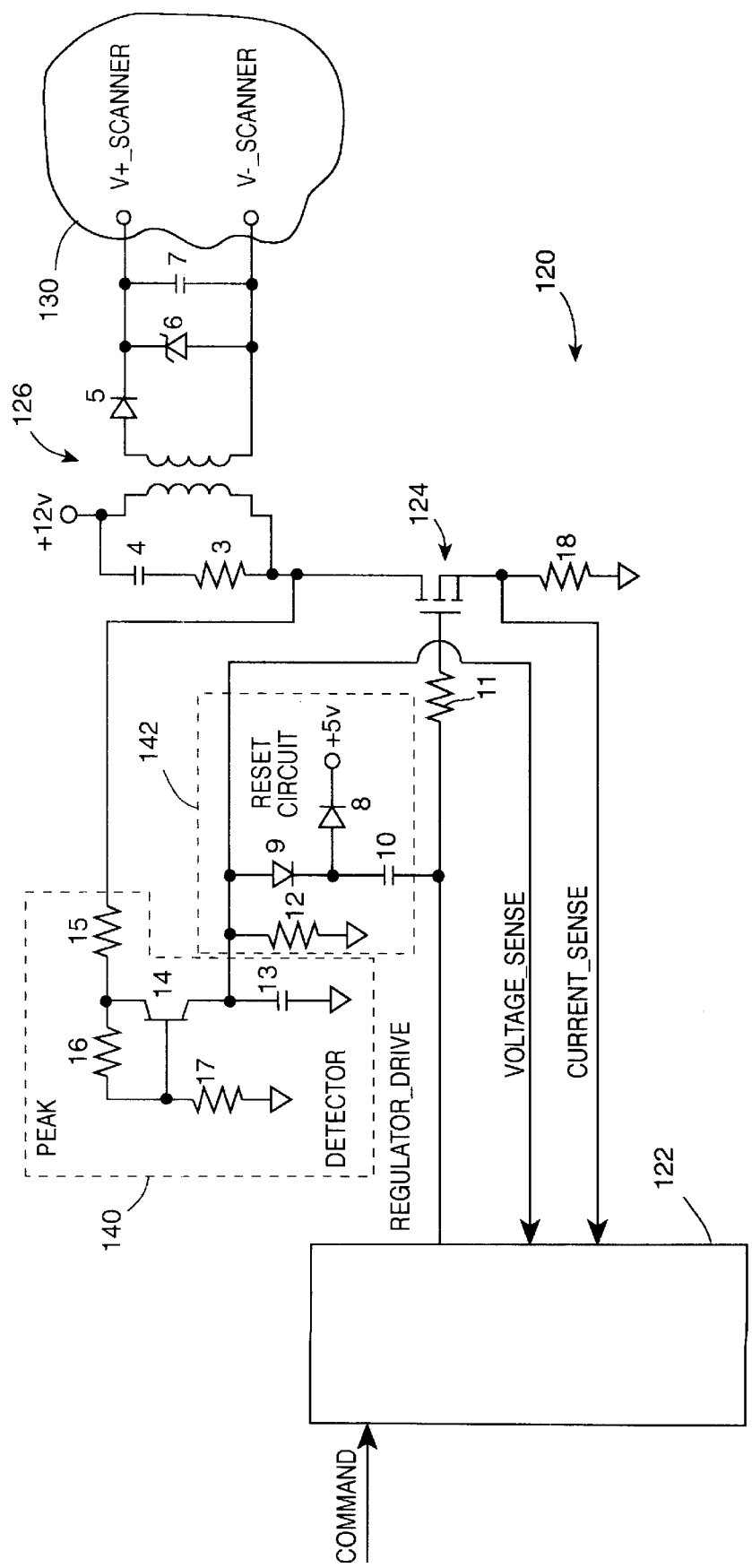
FIG. 1 a schematic view of power supply circuit according to an embodiment of the invention.

FIG. 1 shows a power supply circuit 120 which comprises regulator 122, switching transistor (MOSFET) 124; and power transformer 126 through which power is supplied to a load 130. The regulator 122 is of a type that requires feedback regarding the amount of voltage supplied to the load, the feedback signal being applied on a line Voltage_Sense as illustrated in FIG. 1. In contrast to prior art devices which provide such feedback via some sort of secondary path to couple information about the current output voltage back to the regulator 122 (e.g., such as an opto-isolator or transformer), the present invention generates the required feedback signal by monitoring the input to power transformer 126. To cater for this advantageous capability, the power supply circuit 120 of the present invention further includes peak detector 140 and peak detector reset circuitry 142. Details of the structure and operation of power supply circuit 120 are provided below.

The regulator 122 is a conventional current mode switching regulator, such as a Unitrode UC3846 current mode PWM controller, for example. In FIG. 1, the Regulator_Drive input is supplied by the output of the standard switch mode regulator 122. The signal Voltage_Sense is the return signal from the power supply to the regulator 122 that indicates the amplitude of the voltage at the power supply output (e.g., to load 130 on the V+Scanner and V−Scanner lines). The Current_Sense line is an indication of transformer primary current used by regulator 122 for control.

To begin the switching function of the power supply circuit 120, an oscillator internal to regulator 122 switches a flip/flop (also internal to regulator 122), whose output is connected to the line Regulator_Drive, causing the line Regulator_Drive to go high. The line Regulator_Drive going high then drives the gate of transistor 124 high though resistor 11, turning transistor 124 on. When transistor 124 is turned on the supply is switched across the primary of transformer 126.

Because the supply is switched across the primary coil of power transformer 126, a current linearly begins to rise in this primary. This is because V=L*(di/dt), and since V (the supply voltage) and L (the inductance of the transformer) are constant, so to will be di/dt, which implies that the rise in current will be approximately linear with respect to time. This linear rising current is then sampled by resistor 18, and when this current reaches a desired level (this level will be discussed later) the flip/flop in regulator 122 is then reset, dropping the voltage on the Regulator_Drive input, switching transistor 124 off.

When transistor 124 switches off, a large voltage is generated on it's connection to transformer 126, which is explained again by the previous equation V=L*(di/dt). Switching the current off causes a rapid change in current (to zero), hence a large di/dt, resulting in a large voltage. Resistor 3 and capacitor 4 form a damping network, limiting the size of this voltage spike, allowing use of lower voltage components. Limitation of this voltage spike also tends to limit the noise, which again is of benefit because of the close proximity of the read heads. This action is diagrammed in FIG. 2A–FIG. 2F, the voltage spike S being particularly shown in FIG. 2C. The waveforms of FIG. 2A–FIG. 2F are each depicted in each of state A–E.

The waveforms (see FIG. 2A–FIG. 2F) in state A are in the rest condition. Since the signal Regulator_Drive (FIG. 2A) is low, the output of transistor 124 is off, the Transformer Primary Voltage of power transformer 126 is high at the power supply voltage (+12V in this example), and there is no current in either of the transformer windings. In the state B, Regulator_Drive (see FIG. 2A) is driven high by regulator 122, causing the Transformer Primary Voltage to fall. This causes the linear rise in the Transformer Primary Current. It should be noted that if the Regulator_Drive stays on too long, then this current will saturate to a value determined by the power supply voltage and the DC resistance of the transformer primary winding. This is not a desirable operating point as the flux in the transformer has reached a maximum value, and the efficiency of the supply is suffering. This can be avoided however by appropriate sizing of the component values and choice of operating frequency.

In state C, the output of transistor 124 is turned off, causing the voltage on the primary of power transformer 126 to "flyback", hence the spike S seen on the Transformer Primary Voltage (FIG. 2C). The input that was used to turn off the transistor 124 is the current sense output of the supply, hence the name current mode regulation. When the primary winding of power transformer 126 reaches a current that is proportional to the difference between the output of regulator 122 and an inputted desired output, the Regulator_Drive signal goes low. The practical result of this action is when there is a small error the supply delivers a small current to power transformer 126, when the error is large a large current is supplied. Since the primary of power transformer 126 is no longer switched to ground, the current in the primary quickly falls to zero. Because there is still flux in the transformer core a current appears in the transformer secondary, which is rectified by diode 5, and filtered by output capacitor 7. The voltage across capacitor 7 is then used to power the load 130.

State D shows that the flux in the transformer 126 is being used to charge the capacitor 7 after the spike S has passed. State E is a repeat of state A, the circuit having returned to the rest condition, the flux having been discharged.

Whereas the preceding discussion is generally germane to other "flyback" type switch mode power supplies, the present invention differs, e.g., in how a feedback signal is provided to the regulator 122. For most power supply designs, the distinction between states C and D is unimportant, but that is not true in this case. During state C the primary voltage of the transformer 126 is spiking, and there is no useful information in the signal. However, the present invention capitalizes upon the fact that, during state D, after the spike has passed, the voltage on the primary is the sum of two voltages (i.e., the power supply (+12V) and the voltage at the output of the secondary of power transformer 126).

The present invention obtains the voltage at the output of the secondary of power transformer 126 by obtain the useful information from state D after the spike. In order to perform the sampling after the spike and without sampling the spike, the power supply circuit 120 of the present invention employs peak detector 140. The peak detector 140 is preferably a slew rate limited peak detector for sampling the voltage at the output of the secondary of power transformer 126.

As shown in FIG. 1, peak detector 140 comprises capacitor 13, resistors 15, 16, and 17, and transistor 14. Transistor 14 is employed as an emitter follower, and capacitor 13 that stores the peak. Resistors 16 and 17 are used to divide down the input to the peak detector 140, since the "flyback" voltage on the transformer 126 is much too large to input into the voltage regulation circuit 122. It should be understood that, in differing embodiments and depending upon the specifications and limitations of regulator 122, resistors 16 and 17 may not be required.

Thus, for peak detector 140, resistor 15, transistor 14, and capacitor 13 connected in series between the primary of power transformer 126 and ground. The emitter of transistor 14 is connected both via capacitor 13 to ground and to regulator 122 (e.g., to the voltage sense input of regulator 122). In peak detector 140, resistor 16 and resistor 17 are connected in series between the primary of the power transformer 126 and ground. As explained previously, resistor 16 and resistor 17 divide down an input to the peak detector.

Normally an emitter follower would have the collector connected to a power supply, but such is not the case for transistor 14. This is because the current in a capacitor is proportional to the rate of change of the voltage; i.e. I=C*(dv/dt). This design makes use of this fact because at low slew rates only a small amount of current is required to charge the capacitor 13. This current is supplied by transistor 14 from its collector, which is connected by resistor 15 to the sampled transformer primary. It should be noted that the resistance of resistor 15 is much lower than resistors 16 or 17, so at low slew rates resistor 15 is having almost no effect on the peak detected sample. When a high slew rate is encountered (such as during the spike S) a large current is demanded from the transistor 14, which increases the drop on resistor 15, lowering the peak signal that otherwise would be sampled.

The peak detector reset circuitry 142 is comprised of diodes 8 and 9, capacitor 10, and resistor 12. The peak detector reset circuit 142 comprises diode 9 and diode 8 connected between the emitter of the transistor 14 of the peak detector 140 and a voltage source. Reset circuit capacitor 10 is connected between the diode 9 and a drive output (line Regulator_Drive) of regulator 122. The peak detector reset circuitry 142 is used to reset peak detector 140. The precise location of a sample is easy to determine; it will always occur (once the spike has passed) after transistor 124 has been turned off. The reset circuit 142 makes use of this fact. In this regard, to turn off transistor 124, the Regulator_Drive line switches from the power supply (+12V) to ground. This switch is coupled though capacitor 10 and diode 9 to pull the voltage down on capacitor 13 just prior to a new sample being acquired, resetting the peak detector 140. Diode 8 serves two functions; first it charges capacitor 10 up when the Regulator_Drive line switches high (+12V) forcing 10 to have a voltage of about 6.3 V across it. When the Regulator_Drive line goes low this voltage would push the voltage on 10 below ground if transistor 14 were not there to clamp it. The second function it serves to clamp the maximum value on the Voltage_Sense line to two diodes above the +5V supply. This serves to protect regulator 122 in the event of a supply run away or a transient. Diode 9 isolates the peak detector 140 during this pre-charge operation, and resistor 12 (a high value which does not effect normal operation) serves to reset the peak detector 140 under a condition of no Regulator_Drive pulses.

Figure 3:
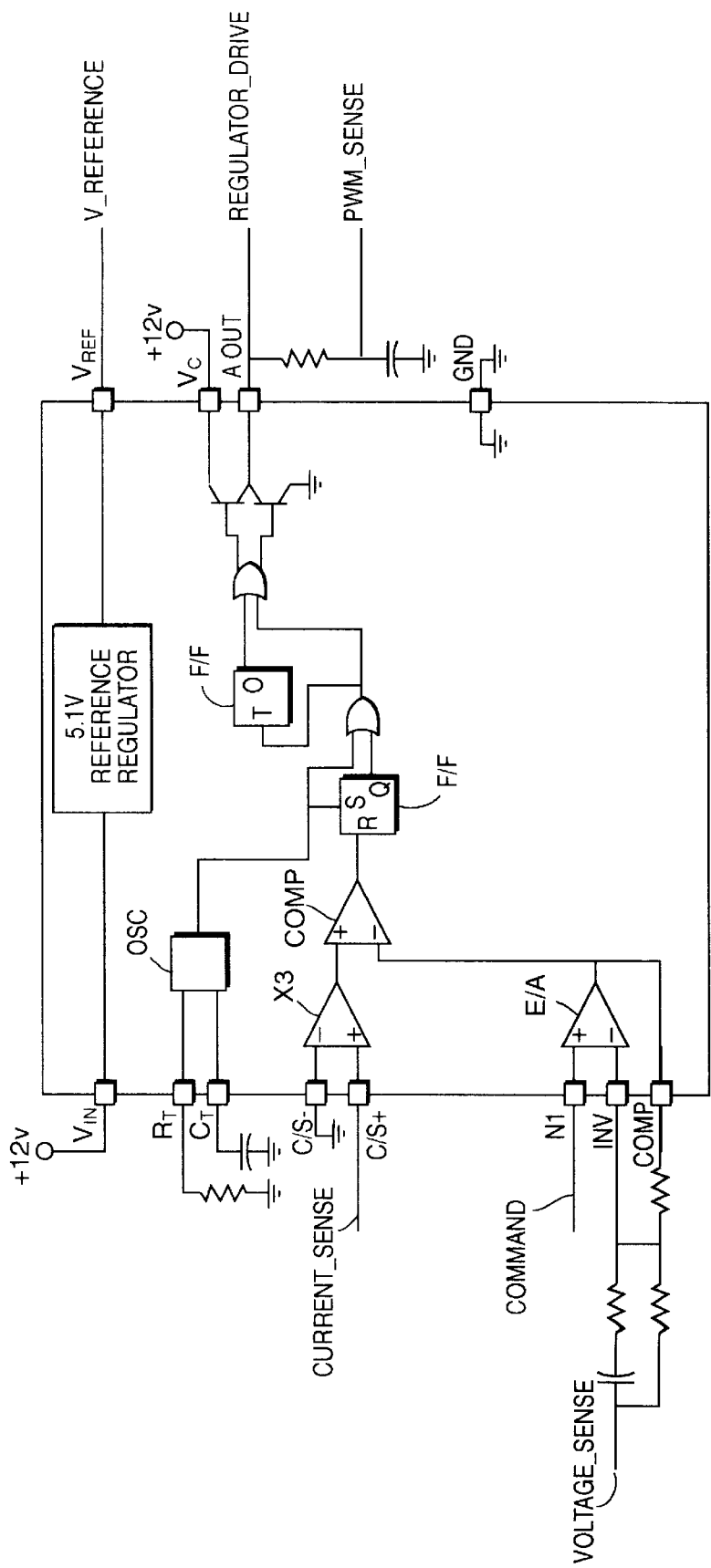
FIG. 3 is a schematic view of an example regulator for use in the power supply circuit of FIG. 1.

FIG. 3 illustrates various selected details of an example regulator 122, such as the Unitrode UC3846 current mode PWM controller mentioned above. Not shown (e.g., removed for clarity) are a second PWM output, under voltage lockout, current limit, and shutdown circuitry. Various timing elements are shown in FIG. 3, such as those that set the operating frequency of the pulse width modulator (CT and RT on the oscillator, labeled Osc), and the compensation and gain setting network on the error amplifier (labeled E/A). This compensation network is a classic lead/lag compensation network formed by the capacitor and the three resistors connected to the error amplifier.

Lines for signals are shown in FIG. 3 which are not shown in FIG. 1: the Command, V_Reference line, and PWM_Sense line. These lines are provided as an interface to the microprocessor so that it may adjust the output level. In practice this is done by use of a DAC (Digital to Analog Converter), the high input of the DAC being connected to the V_Reference line, the low input of the DAC being connected to ground, and the output of the DAC being connected to the Command signal. Using this connection the microprocessor can set the Command signal to any level between ground and V_Reference. Discussion of how this DAC in conjunction with the PWM_Sense signal is used to calibrate the power supply is provided below.

To start a regulation cycle the oscillator sets the S-R flip/flop (F/F). This, though the toggle flip/flop, turns on the Regulator_Drive output, turning on the transistor 124. The toggle flip/flip is included to limit the output to a maximum 50% duty cycle, i.e. the Regulator_Drive output can only be turned on every other cycle of the oscillator, it has to be off on the next cycle, allowing the flux in the power transformer to decay. The Voltage_Sense signal is gained and compensated by the error amplifier (E/A) and compared with the output of the Current_Sense (gained up by a factor of 3 by amplifier is X3). As described previously, when transistor 124 is turned on the current in the power transformer 126 rises linearly until it exceeds the threshold determined by the output of the error amplifier (E/A), upon which the S-R flip/flop is reset, and transistor 124 turned off.

One example implementation of power supply circuit 120 of FIG. 1 occurs in a drive for transducing information relative to an information storage medium, e.g., a tape drive that records and reproduces information relative to magnetic tape. Some such drives have a rotating drum or "scanner", upon which are mounted transducing elements or heads (e.g., read heads and write heads). The power supply circuit 120 of the present invention can be utilized, therefore, to provide power to the electronic components on the drum or scanner. However, unlike other applications which employ a conventional transformer, the transformer utilized to supply power to a rotating drum or scanner has a variable air gap between the two halves of the core. This air gap is a result of having to move the two halves of the core with respect to each other. A consequence of this variable air gap is that the coupling coefficient of the transformer is also variable, causing the precise voltage output level not to be known.

To address the variable air gap problem, some method of calibrating the output voltage level has to be adopted. The present invention provides such a calibration technique which, advantageously, is not invasive (e.g., does not require that a test fixture be attached to the spinning portion of the scanner), and which can be done periodically by the drive using firmware so the effects of aging of repair could be mitigated.

In the above regard, the power supply circuit 120 of the present invention comprises a zener diode 6 which is placed in parallel across the secondary of power transformer 126 to the output of the supply. Zener diode 6 does not perform any operation in normal operating mode, since regulator 122 is set to run below it. However, zener diode 6 provides a precise reference on the rotating portion of the scanner whose effect can be measured on the stationary side.

The calibration technique of the present invention is now basically described. As the operating point of the regulator circuit (e.g., an input signal Commanded Output voltage ["Command"]) is raised, the output current of the supply is monitored. The output current will rise as the commanded voltage is increased until zener diode 6 starts to turn on. The output current then stops rising, leveling off as the command is raised until zener diode 6 is on 100% of the time the secondary is charging the output capacitor 7. At this point the output current will rise rapidly with increased command. It should be noted that continuous operation in this range could damage the supply. In practice the supply would be run just below the point where the output current levels out, this supplies an operating point just below the turn on voltage of zener diode 6. The reason is that, when zener diode 6 turns on, the impedance at the output of power transformer 126 is lowered, causing a larger spike to be produced at the transformer primary when it is switched off. The longer zener diode 6 is on the larger this effect. The end result is that as zener diode 6 turn on time increases from 0 to 100% of the discharge time the supply appears to be generating a larger output voltage, satisfying the increased command voltage, but with no actual increase in output. This is useful because a fairly large error in setting the operating point will not cause an increase in the supply output, allowing a more robust system to be designed.

There is no direct reading of zener diode 6, as it is on the secondary side of the transformer 126, and is rotating in the tape drive embodiment described below. What is monitored is the Regulator_Drive signal. It is low pass filtered using a simple R-C, which supplies a DC voltage that is proportional to the duty cycle of the transistor 124 (the PWM_Sense signal). To do the calibration the microprocessor starts with the DAC set to zero, and then steps it up to V_Reference. During this process the PWM_Sense signal is monitored. This process results in a plot shown in FIG. 7.

Figure 7:
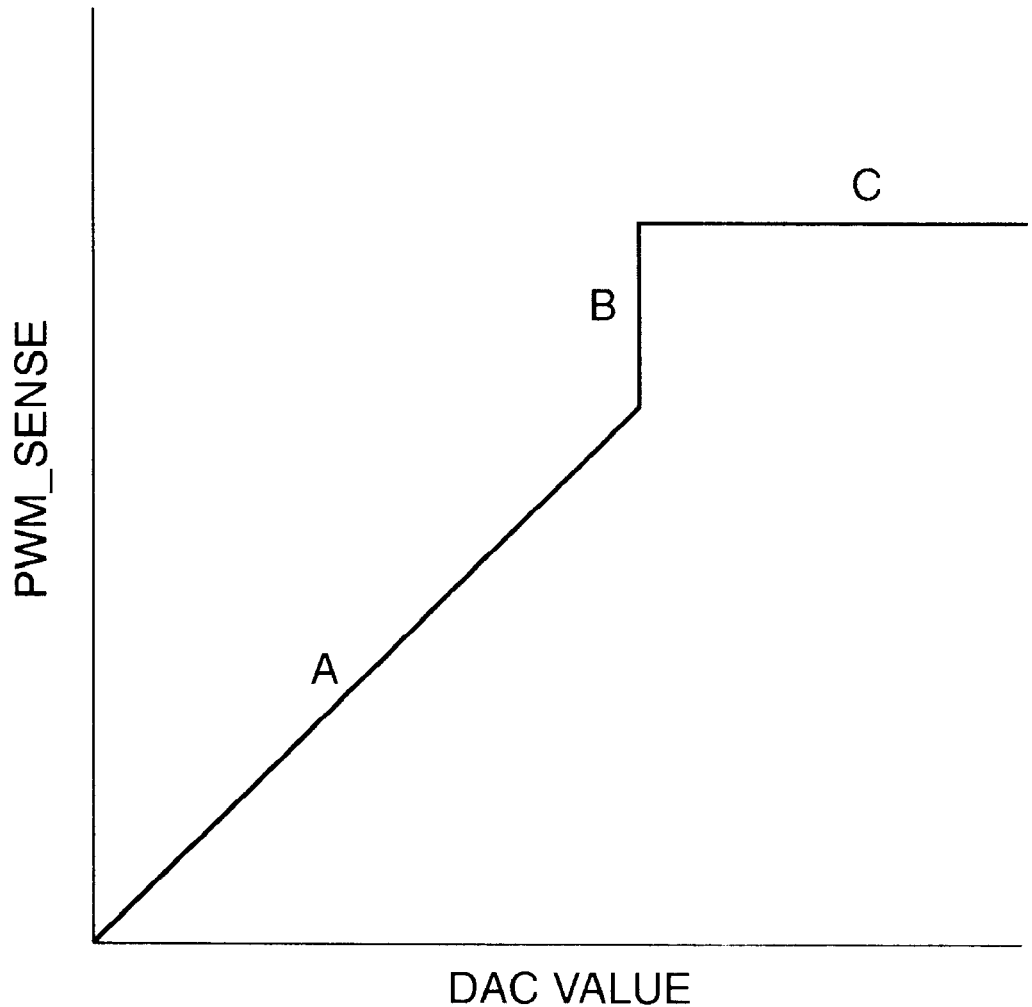
FIG. 7 is a graph illustrating calibration of the power supply circuit of FIG. 1 in accordance with a calibration technique of the present invention.

Note that, in FIG. 7, there are three operating regions, the first where increasing the DAC value slowly increases the PWM_Sense signal (region A), then the portion where the slope becomes much steeper (region B), and then the final portion where no further increase in PWM_Sense is present (region C). Region A is the region where increasing the DAC value increases the output on the transformer secondary. Region B is where the zener diode 6 on the secondary goes from just starting to turn on to where it is on during the entire charging cycle (the period when current is following in the transformer secondary). And region C is where the supply has saturated, and can deliver no more power. To calibrate the drive the point just below the junction of regions A and B is chosen, this sets the operating point to just below the zener voltage. In this fashion the zener is off during normal operation, and no additional power is expended.

Figure 4:
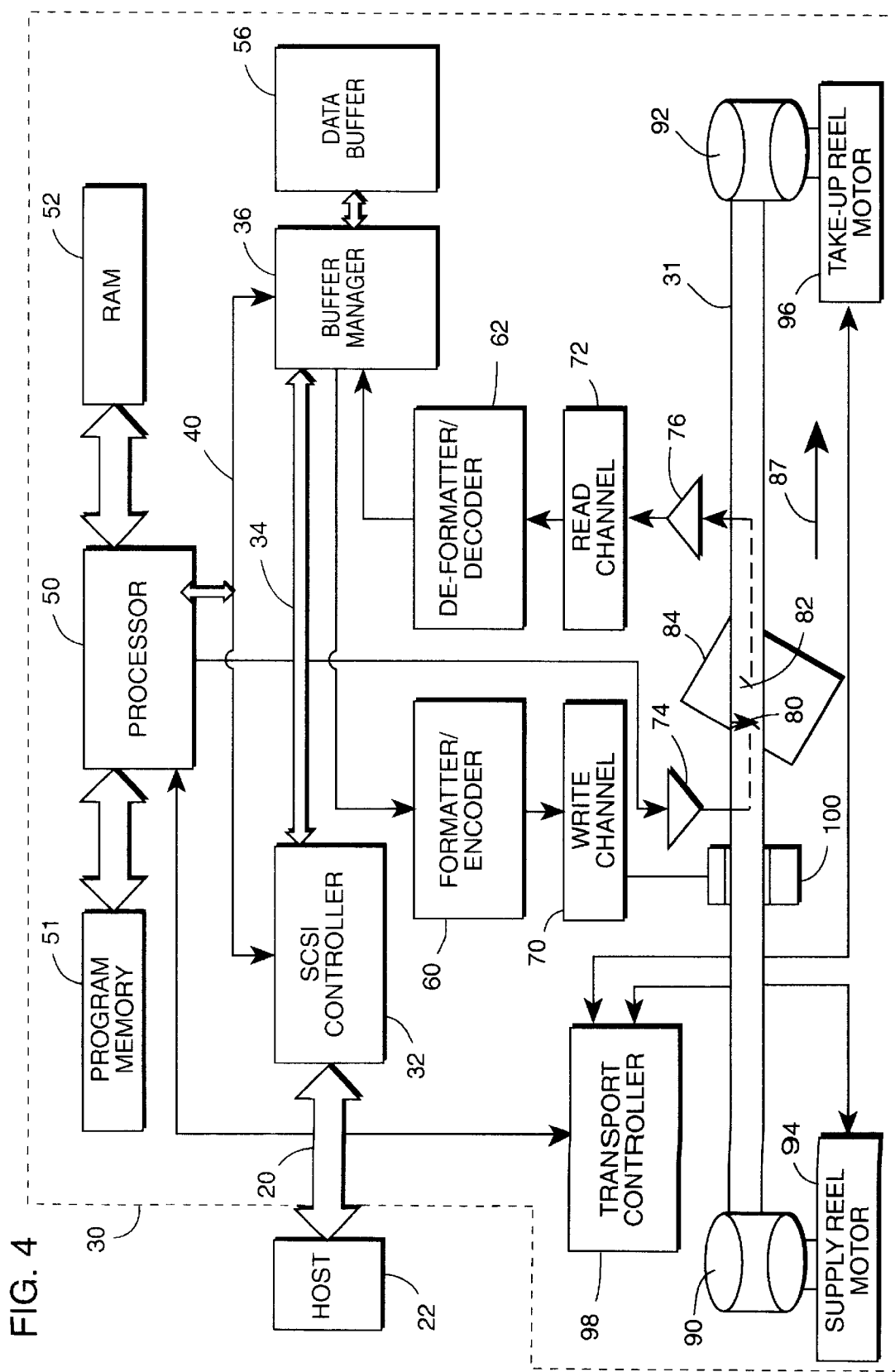
FIG. 4 is a schematic view of a tape drive which is an example application for use of the power supply circuit of FIG. 1.

FIG. 4 shows basic components of a tape drive 30 with which the power supply circuit 120 of the invention can be utilized for supplying power to electronic components on a scanner or drum 84. FIG. 4 particularly shows a SCSI bus 20 which connects a host computer 22 and a first embodiment of a SCSI target storage device, particularly tape drive 30. In the illustrated embodiment, tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to formatter/encoder 60 and to deformatter/decoder 62. Formatter/encoder 60 and deformatter/decoder 62 are, in turn, respectively connected by one or more write channels 70 and read channels 72. Write channels 70 are connected via write amplifier(s) 74 to one or more recording element(s) or write head(s) 80; read channels are connected via read amplifier(s) 76 to one or more read element(s) or read head(s) 82.

Those skilled in the art will appreciate that write channels 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Write head(s) 80 and read head(s) 82 are situated on a peripheral surface of the rotating drum or scanner 84. Tape 31 is wrapped around drum 84 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around drum 84.

The present invention is useful with numerous types of helical scan tape drives. For example, in one type of tape drive, tape 31 is transported by an unillustrated capstan which is rotated by a capstan motor. The drum has one write head and one read head, mounted 180 degrees apart on the periphery of the drum. In this type of tape drive, the capstan motor is controlled by transport controller 98, which ultimately is governed by processor 50. An example of this first type of tape drive is the EXB-8200 model tape drive manufactured by Exabyte Corporation, and which is illustrated e.g., in U.S. Pat. No. 4,843,495; U.S. Pat. No. 4,845, 577; and U.S. Pat. No. 5,050,018, all of which are incorporated herein by reference.

A second type of tape drive with which the invention is useful is the MammothJ tape drive manufactured by Exabyte Corporation, and which is illustrated e.g., in U.S. Pat. No. 5,602,694, incorporated herein by reference. In this second type of type drive, two write heads and two read heads are mounted on the drum. A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

Figure 5:
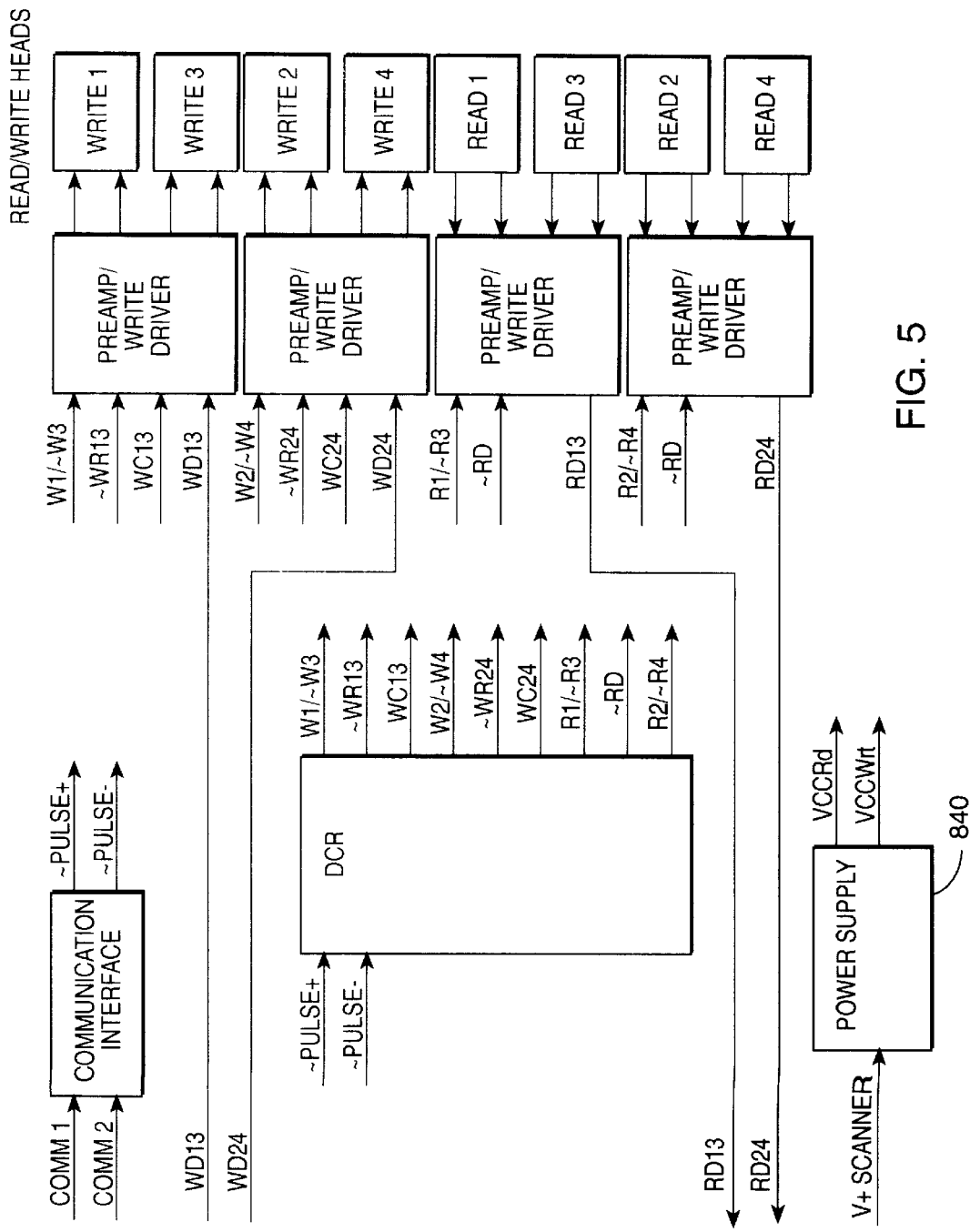
FIG. 5 is a schematic view showing components including electronic components situated on a rotating head or scanner of the tape drive of FIG. 4.
Figure 6:
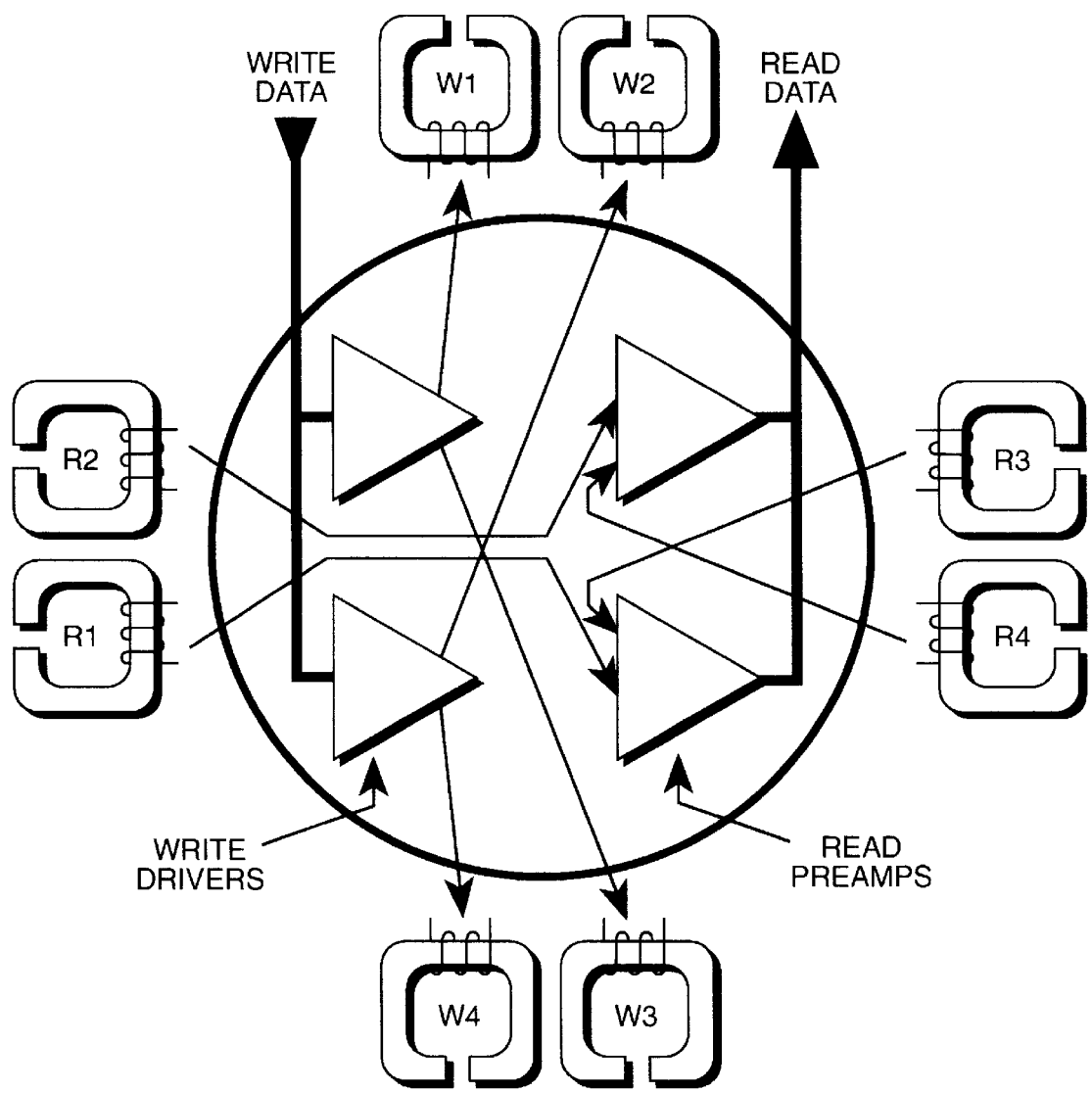
FIG. 6 is a diagrammatic view of selected components of the tape drive of FIG. 4.

Details of circuitry included on drum or scanner 84 (e.g., the load 30 for the tape drive utilization embodiment are shown in FIG. 5 and FIG. 6). The definition of the names for these figures are as shown in Table 1.

The power supply portion of scanner 84 is contained in the bottom box 840, the remainder of the electronics are involved with read and write operations. Box 840 comprises the rectifier, the calibration zener diode 6, filter capacitors, and a low drop out linear regulator for each of the read and write power supplies. The rationale for the separate power supplies is to minimize write to read crosstalk, as both operations occur concurrently. Separating the supplies with active rather than passive components was done as it was a smaller, lower cost solution.

It should be noted, however, that the Scanner voltage as depicted in FIG. 2E does not share a ground reference with any of the other signals, the electronics on the scanner are floating with respect to ground. Also it should be noted that the waveform presented is a ripple on top of a DC term, examination of the waveform will show that it increases during the time the transformer secondary current is non-zero, and that it decays otherwise. If the supply were turned off it would ultimately decay (over the course of a few mSec) to zero.

The power transformer 126 is different than in most power supply designs as transformer 126 is used to couple power from the stationary power supply circuit to a rotating load (e.g., rotating scanner, in this application the primary of the transformer is stationary, and the secondary is mounted on the scanner, free to spin.

Resistor 11 is optional, and is included in the embodiment of FIG. 1 to slow the turn on and turn off of transistor 124. In a normal regulator this may not be desirable because during the time transistor 124 is switching the device is in the linear region, causing it to dissipate more power than it would otherwise, lowering the efficiency of the supply. In a particular embodiment discussed herein wherein power supply circuit 20 is utilized in a tape drive, reducing the generation of high frequency energy is desired so the action of this resistor is desirable. This is because this supply is close to the tape drive read heads, whose sensitivity to noise is greater at high frequency.

While the invention has been described in connection with what is presently considered to be the most practical and preferred embodiment, it is to be understood that the invention is not to be limited to the disclosed embodiment, but on the contrary, is intended to cover various modifications and equivalent arrangements.

TABLE 1

| | |
|---|---|
| DCR: | Drum Communication Receiver, a custom integrated circuit that convert the timing pulses from the communication transformer into control signals for the preamplifier/write drivers. It also stores the write current values for each of the four write heads. |
| Comm1,2: | Communication transformer winding. |
| WD13: | Write data for channels 1 and 3. |
| WD24: | Write data for channels 2 and 4. |
| -Pulse+: | Internal scanner control signal. |
| -Pulse-: | Internal scanner control signal. |
| RD13: | Read data from channels 1 and 3. |
| RD24: | Read data from channels 2 and 4. |
| V+ Scanner: | Output of the disclosed switch mode power supply. Supplies all power to the flying electronics. |
| W1/~W3: | Write head select for channels 1 and 3. |
| ~WR13: | Write mode select for channels 1 and 3. |
| WC13: | Write current set for channels 1 and 3. An analog signal. |
| W2/~W4: | Write head select for channels 2 and 4. |
| ~WR24: | Write mode select for channels 2 and 4. |
| WC24: | Write current set for channels 2 and 4. An analog signal. |
| R1/~R3: | Read head select for channels 1 and 3. |
| ~RD: | Read enable. Currently unused, the chip selects for the 2 read preamplifier parts are grounded, permanently enabling the parts. |
| R2/~R4: | Read head select for channels 2 and 4. |
| VCCRd: | Read power supply. |
| VCCWrt: | Write power supply. |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power supply circuit for supplying power to a load, comprising:
    a regulator of a type that requires feedback regarding the amount of voltage supplied to the load;
    a switching transistor connected to the regulator;
    a power transformer connected between the switching transistor and the load;
    wherein a feedback signal to the regulator is generated by monitoring an input to the power transformer; wherein a voltage signal related to a voltage on the primary of the power transformer after a voltage spike is applied as the feedback signal to the regulator;
    a peak detector connected to a primary of the power transformer, the peak detector detecting the voltage spike and applying the voltage signal related to a voltage on the primary of the power transformer after the voltage spike to the regulator.

2. The apparatus of claim 1, wherein the regulator is a current mode switching regulator.

3. The apparatus of claim 1, wherein a primary of the power transformer is connected to a power supply voltage and to the switching transistor, wherein a damping network is connected in parallel to the primary of the power transformer, and wherein a secondary of the power transformer is connected to the load.

4. The apparatus of claim 1, wherein the peak detector is a slew rate limited peak detector.

5. The apparatus of claim 1, wherein the voltage signal on the primary of the power transformer comprises a sum of the power supply voltage and a voltage at the output of a secondary of the power transformer.

6. The apparatus of claim 1, further comprising a peak detector reset circuit which resets the peak detector.

7. The apparatus of claim 1, wherein the peak detector comprises:
    a first resistor, a transistor, and a capacitor connected in series between the primary of the power transformer and ground, an emitter of the transistor being connected both via the capacitor to ground and to the regulator.

8. The apparatus of claim 7, wherein the peak detector comprises:
    a second resistor and a third resistor connected in series between the primary of the power transformer and ground, wherein the second resistor and the third resistor divide down an input to the peak detector.

9. The apparatus of claim 1, wherein the peak detector comprises a transistor connected as an emitter follower between the primary of the power transformer and ground, a collector of the power transformer being connected to the primary of the power transformer and an emitter of the transistor being connected to the regulator.

10. The apparatus of claim 9, wherein the peak detector further comprises a capacitor connected between the emitter of the transistor and ground.

11. The apparatus of claim 9, further comprising a peak detector reset circuit which resets the peak detector.

12. The apparatus of claim 11, wherein the peak detector reset circuit comprises:
    a first diode and a second diode connected between the emitter of the transistor of the peak detector and a voltage source;
    a reset circuit capacitor connected between the first diode and a drive output of the regulator.

13. The apparatus of claim 12, wherein the first diode serves as an isolating diode and the second diode serves as a charging and clamping diode.

14. The apparatus of claim 1, wherein a variable air gap exists between a stationary primary of the power transformer and a secondary of the power transformer.

15. The apparatus of claim 14, wherein the secondary of the power transformer is mounted with the load on a rotatable element.

16. The apparatus of claim 14, wherein a zener diode is connected in parallel across the secondary of the power transformer.

17. A method of operating a power supply circuit for supplying power to a load, the power supply circuit comprising a regulator of a type that requires feedback regarding the amount of voltage supplied to the load; a switching transistor connected to the regulator; and a power transformer connected between the switching transistor and the load; wherein the method comprises:

turning off the switching transistor to cause voltage on a primary of the power transformer to flyback;

applying, as a feedback signal to the regulator, a voltage signal related to a voltage on the primary of the power transformer after a voltage spike;

connecting a peak detector to a primary of the power transformer;

using the peak detector to detect the voltage spike; and applying the voltage signal related to a voltage on the primary of the power transformer after the voltage spike to the regulator.

18. The method of claim 17, wherein the regulator is operated as a current mode switching regulator.

19. The method of claim 17, further comprising applying the voltage signal to a voltage sense input of the regulator.

20. The method of claim 17, further comprising providing a damping network connected in parallel to the primary of the power transformer.

21. The method of claim 17, wherein the voltage signal on the primary of the power transformer comprises a sum of the power supply voltage and a voltage at the output of a secondary of the power transformer.

22. The method of claim 17, further comprising using a peak detector reset circuit to reset the peak detector.

\* \* \* \* \*